United States Patent
Lee et al.

(10) Patent No.: US 9,619,900 B2
(45) Date of Patent: Apr. 11, 2017

(54) SYSTEMS AND METHODS FOR IDENTIFYING ANOMALOUS TEST ITEM RENDERINGS

(71) Applicant: Educational Testing Service, Princeton, NJ (US)

(72) Inventors: Mankit Lee, Plainsboro, NJ (US); Roman Merkushen, Lanoka Harbor, NJ (US); Ketan Thakker, Plainsboro, NJ (US)

(73) Assignee: Educational Testing Service, Princeton, NJ (US)

(*) Notice: Subject to any disclaimer, the term of this patent is extended or adjusted under 35 U.S.C. 154(b) by 0 days.

(21) Appl. No.: 14/928,064

(22) Filed: Oct. 30, 2015

(65) Prior Publication Data
US 2016/0125269 A1 May 5, 2016

Related U.S. Application Data

(60) Provisional application No. 62/073,599, filed on Oct. 31, 2014.

(51) Int. Cl.
*G06K 9/68* (2006.01)
*G06T 11/00* (2006.01)
*G06T 7/00* (2017.01)

(52) U.S. Cl.
CPC .......... *G06T 11/00* (2013.01); *G06T 7/0002* (2013.01); *G06T 2207/30168* (2013.01)

(58) Field of Classification Search
CPC .......... G06T 11/00; G06T 2207/30168; G06T 7/0002
USPC .......................................................... 382/219
See application file for complete search history.

(56) References Cited

U.S. PATENT DOCUMENTS

| 9,099,007 B1* | 8/2015 | Abumov | G06F 17/21 |
| 2008/0152206 A1* | 6/2008 | Vining | G06F 17/30256 |
|  |  |  | 382/132 |

* cited by examiner

*Primary Examiner* — Manuchehr Rahmjoo
(74) *Attorney, Agent, or Firm* — Jones Day

(57) ABSTRACT

Systems and methods are provided for determining a test item rendering anomaly. A test item is provided to a first test item rendering system that is configured to generate a first graphical representation of the test item. The test item is provided to a second test item rendering system that is configured to generate a second graphical representation of the test item. A first digital pixel image of the first graphical representation is captured, and a second digital pixel image of the second graphical representation is captured. Pixels of the digital pixel images are processed, where the processing includes comparing the digital pixel images to determine an extent to which the second digital pixel image differs from the first digital pixel image. An indication for the test item is provided when the second digital pixel image differs from the first digital pixel image by more than a threshold amount.

18 Claims, 7 Drawing Sheets

ANOMALY REPORT

| ITEM | CERT ENGINE | CUR ENGINE | DATE |
|---|---|---|---|
| 20938 | 1B | 2R | 10/2/14 |
| 94235 | 3C | 3D | 10/7/14 |
| 34732 | 3C | 3D | 10/11/14 |
| 79404 | 3C | 3D | 10/15/14 |

FIG. 4

SYSTEMS AND METHODS FOR IDENTIFYING ANOMALOUS TEST ITEM RENDERINGS

CROSS-REFERENCE TO RELATED APPLICATIONS

This application claims priority to U.S. Provisional Patent Application No. 62/073,599, filed Oct. 31, 2014, entitled "Systems and Methods for Identifying Anomalous Test Item Renderings," which is incorporated herein by reference in its entirety.

FIELD

This disclosure is related generally to test generation and more particularly to detecting anomalous test item renderings.

BACKGROUND

Significant effort is put into the design of test items for an examination, such as a high-stakes standardized examination. Test items that are understandable and fair enable a proper assessment of test takers. Erroneous test item displays could result in illegitimate test scores. For example, providing test items in small print to those who have visual impairments would not result in an accurate assessment of that person's substantive abilities. Similarly, providing test items having red and green colors would disadvantage some students suffering from colorblindness. In some instances, a certification process is applied to test items to ensure that those test items provide a fair and accurate assessment of a test taker's abilities.

SUMMARY

Systems and methods are provided for determining a test item rendering anomaly. In an example computer-implemented method of determining a test item rendering anomaly, a test item is provided to a processor-based first test item rendering system. The first test item rendering system includes a graphics rendering engine and is configured to generate a first graphical representation of the test item. The test item is provided to a second processor-based test item rendering system. The second test item rendering system includes a graphics rendering engine and is configured to generate a second graphical representation of the test item. A first digital pixel image of the first graphical representation is captured, and a second digital pixel image of the second graphical representation is captured. Pixels of the first and second digital pixel images are processed, where the processing includes using an automated digital image analysis algorithm. The processing includes comparing the first digital pixel image to the second digital pixel image, and the algorithm generates a numerical metric that indicates an extent to which the second digital pixel image differs from the first digital pixel image. An anomaly indication for the test item is provided when the numerical metric indicates that the second digital pixel image differs from the first digital pixel image by more than a threshold amount.

In another example, a computer-implemented system for determining a test item rendering anomaly includes one or more processing systems and one or more non-transitory computer-readable storage mediums in communication with the one or more processing systems. The one or more non-transitory computer-readable storage mediums are encoded with instructions for commanding the one or more processing systems to execute steps. In executing the steps, a test item is provided to a processor-based first test item rendering system. The first test item rendering system includes a graphics rendering engine and is configured to generate a first graphical representation of the test item. The test item is provided to a second processor-based test item rendering system. The second test item rendering system includes a graphics rendering engine and is configured to generate a second graphical representation of the test item. A first digital pixel image of the first graphical representation is captured, and a second digital pixel image of the second graphical representation is captured. Pixels of the first and second digital pixel images are processed, where the processing includes using an automated digital image analysis algorithm. The processing includes comparing the first digital pixel image to the second digital pixel image, and the algorithm generates a numerical metric that indicates an extent to which the second digital pixel image differs from the first digital pixel image. An anomaly indication for the test item is provided when the numerical metric indicates that the second digital pixel image differs from the first digital pixel image by more than a threshold amount.

In another example, a non-transitory computer-readable storage medium for determining a test item rendering anomaly comprises computer executable instructions which, when executed, cause a processing system to execute steps. In executing the steps, a test item is provided to a processor-based first test item rendering system. The first test item rendering system includes a graphics rendering engine and is configured to generate a first graphical representation of the test item. The test item is provided to a second processor-based test item rendering system. The second test item rendering system includes a graphics rendering engine and is configured to generate a second graphical representation of the test item. A first digital pixel image of the first graphical representation is captured, and a second digital pixel image of the second graphical representation is captured. Pixels of the first and second digital pixel images are processed, where the processing includes using an automated digital image analysis algorithm. The processing includes comparing the first digital pixel image to the second digital pixel image, and the algorithm generates a numerical metric that indicates an extent to which the second digital pixel image differs from the first digital pixel image. An anomaly indication for the test item is provided when the numerical metric indicates that the second digital pixel image differs from the first digital pixel image by more than a threshold amount.

BRIEF DESCRIPTION OF THE DRAWINGS

FIG. 4 is a diagram depicting an example anomaly report.

DETAILED DESCRIPTION

Figure 1:
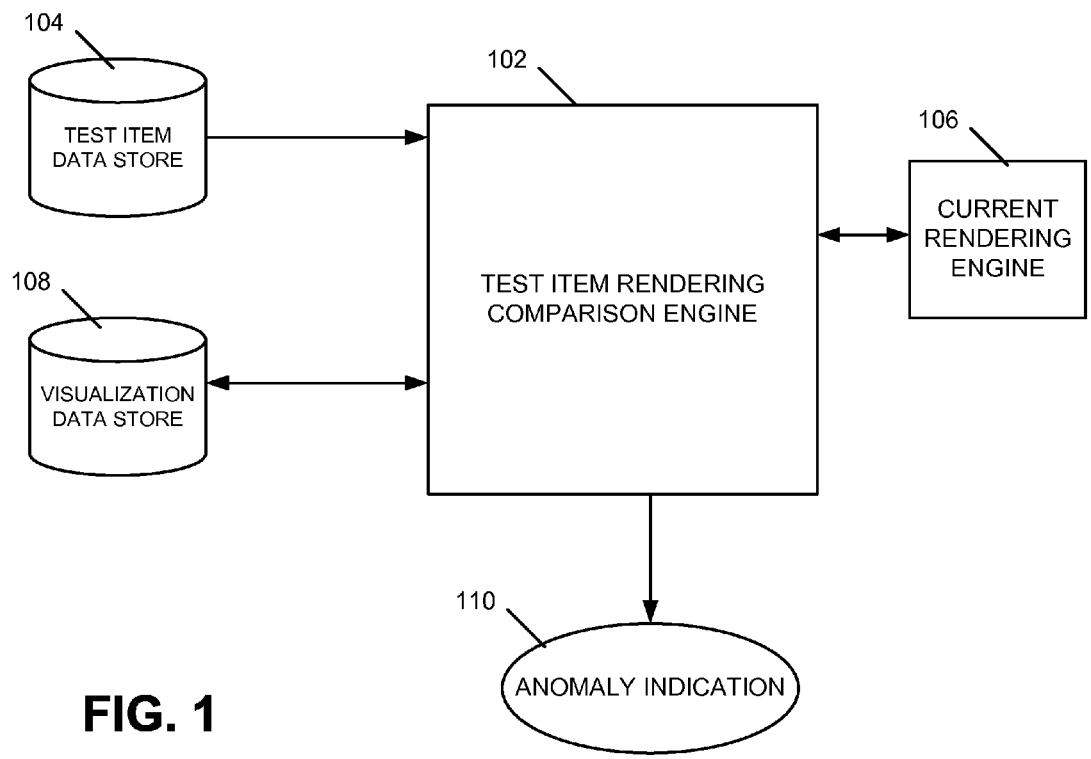
FIG. 1 is a block diagram depicting a computer-implemented test item rendering comparison engine.

FIG. 1 is a block diagram depicting a computer-implemented test item rendering comparison engine. As discussed above, test administrators seek to ensure that test items appear properly on an examination, so as to provide an accurate and fair assessment of test taker abilities. While new test items are continually developed, rendering engines that display test items (e.g., for display on a computer screen or for printing on paper), evolve and are replaced over time. For example, a rendering system may be modified to fix bugs, for compatibility with other software, to improve performance, or for other reasons. When a test item is provided to a different item rendering system (e.g., a later version of an item rendering system, a new item rendering system, etc.), that test item may be rendered differently. Such different rendering could result in that test item becoming unfair or otherwise an inaccurate judge of test taker substantive ability.

The test item rendering comparison engine 102 of FIG. 1 tracks changes in rendering of a test item through the evolution of test item rendering engines. In this manner, the comparison engine 102 may be used to perform quality control on test item rendering engines and/or test items, e.g., by detecting when a current item rendering engine is rendering a test item differently than a previous item rendering engine. A test item data store 104 stores a plurality of test items, such as a test item bank from which test items are selected to generate a test. Periodically, such as when a new version of a test item rendering engine 106 is being tested or has been released, the test item rendering comparison engine 102 accesses a test item from the test item data store 104 and provides it to the current rendering engine 106. The rendering engine 106 may be a processor-based system including a graphics rendering engine.

The rendering engine 106 generates a graphical representation of the test item, and a digital pixel image of the visualization is captured and stored in a visualization data store 108. As referred to herein, a digital pixel image is a digitally-represented image containing multiple pixels, where each of the pixels has one or more pixel values representing color and/or intensity of the pixel. In an example, the current rendering engine 106 comprises a processor based system (e.g., comprising computer software, firmware, and/or hardware) that is configured to process the test item and convert the test item into a form suitable for display on a computer monitor and/or for printing on paper. The current rendering engine 106 may comprise a software algorithm including instructions to display certain graphical features and may also include graphics rendering hardware, including specialized graphics processors (e.g., graphics processing units (GPUs), application-specific integrated circuits (ASICs), etc.). The digital pixel image may be stored at 108 along with certain metadata including data that identifies the test item, the rendering engine (e.g., rendering engine name and version), and the date of the digital image capture.

The test item rendering comparison engine 102 further compares the newly captured digital pixel image to a previous digital pixel image representative of a graphical representation of the test item generated by a different rendering engine. The different rendering engine may be, for example, a previous rendering engine. In examples, the different rendering engine comprises a processor based system (e.g., comprising computer software, firmware, and/or hardware) that is configured to process the test item and convert the test item into a form suitable for display on a computer monitor and/or for printing on paper. Like the current rendering engine 106, the different rendering engine may comprise a software algorithm including instructions to display certain graphical features and may also include graphics rendering hardware, including specialized graphics processors. In an example, the comparison between the newly captured digital pixel image and the previous digital pixel image is performed using an automated digital image analysis algorithm that implements one or more computer-based image processing techniques (e.g., a pixel-by-pixel comparison, etc.) to compare the images in an automatic manner and without human intervention (or involving only minimal human intervention). If the comparison indicates that the new digital pixel image differs from the previous digital pixel image by more than a threshold amount, then an anomaly indication is issued at 110, indicating that the test item and/or the rendering engine 106 may need to be evaluated or adjusted. In an example, the test item is certified as a usable test item based on the previous digital pixel image, and a determination as to whether the test item retains a certified status is based on the comparing of the new digital pixel image to the previous digital pixel image.

As noted above, the test item data store 104 stores a plurality of test items and may comprise a test item bank from which test items are selected to generate a test. The process described above may be repeated for other test items stored in the test item data store 104. In an example, the test item data store 104 may include large amounts of data (e.g., tens, hundreds, thousands, or millions of test items). When a new version of a test item rendering engine is being tested or has been released, it may be desirable to compare item renderings generated by the new and previous versions of the test item rendering engine for all test items included in the data store 104. The computer-based image processing technology described herein may be used to perform the comparisons of the test item renderings in a relatively small amount of time for a large number of test items with repeatability and consistency in the assessment being carried out.

Figure 2:
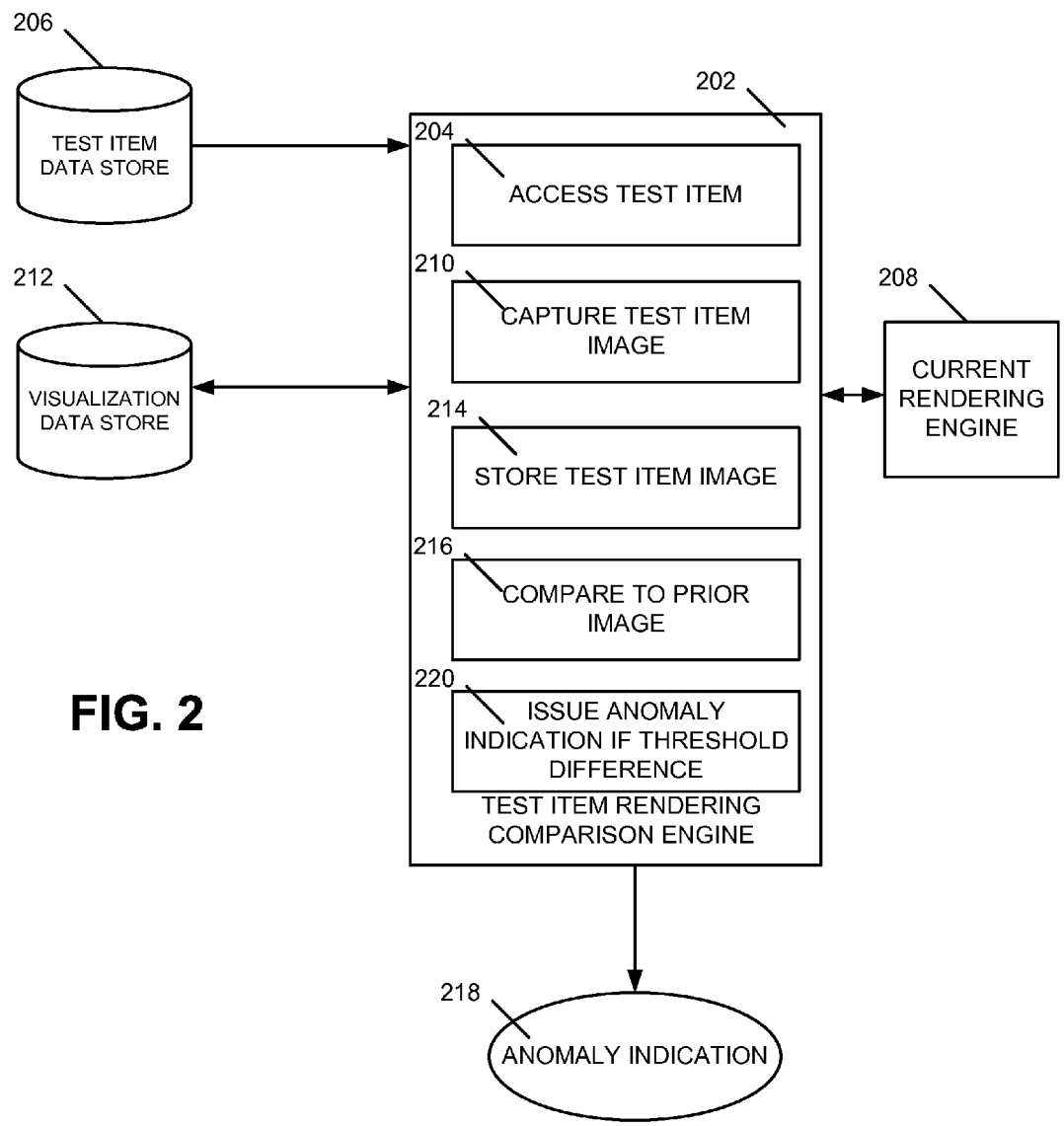
FIG. 2 is a block diagram depicting example operations of a test item rendering comparison engine.

FIG. 2 is a block diagram depicting example operations of a test item rendering comparison engine 202. The test item rendering comparison engine 202 is configured to access a test item at 204 from a test item data store 206. The test item is provided to a current version of a test item rendering system 208. In examples, the test item rendering system 208 is a processor-based rendering system including a graphics rendering engine. The test item rendering system 208 is configured to generate a graphical representation of the test item, and a screen capture of that graphical representation is captured at 210 and stored in a visualization data store 212 at 214. The screen capture may be a digital pixel image, as described herein. At 216, the test item rendering comparison engine 202 compares the captured digital pixel image to a prior captured digital pixel image, such as a prior captured image of the test item rendered by a prior version of the rendering engine. The prior captured digital pixel image may be accessed from the visualization data store 212, in an example.

In comparing the newly captured image and the prior captured image, these images are processed using a computer processing system. In an example, the processing includes using an automated digital image analysis algorithm to compare the newly captured image to the prior captured image. The automated digital image analysis algorithm may generate a numerical metric that indicates an extent to which the newly captured image differs from the prior captured image. In an example, the automated digital image analysis algorithm implements a pixel-by-pixel comparison between the newly captured image and the prior captured image. The pixel-by-pixel comparison is used in determining a number of pixels having pixel values that differ between the images, with the number of pixels being a numerical metric that indicates an extent to which the newly captured image differs from the prior captured image. The pixel-by-pixel comparison may be carried out using conventional, automated, computer-based algorithms known to those of ordinary skill in the art. Further, for example, the digital image analysis algorithm may carry out edge detection and boundary detection to identify significant features (e.g., circles, squares, other geometric features, high-contrast boundaries between light and dark regions, etc.) in the respective images. The digital image analysis algorithm may further carry out alignment (e.g., within a limited spatial range of proximity, such as 5, 10, 20, 100 pixels, etc.) of such significant features to obtain an initial alignment and then identify any differences elsewhere in the image.

When pixel values for more than a threshold number of pixels differ between the newly captured and prior captured images, an anomaly is detected and an anomaly indication 218 is issued at 220. The anomaly indication 218 indicates that the current rendering engine 208 renders the test item differently than the prior rendering engine. The anomaly indication 218 indicates to a user (e.g., a technician) that either the test item or the current rendering engine 208 may need attention to ensure proper operation and rendering of the test item.

In an example, metadata for each of the newly captured image and the prior captured image are stored in one or more data structures. The metadata may include data that identifies (i) the test item, (ii) the rendering system used in generating the digital image (e.g., name of rendering system, version of rendering system, etc.), and (iii) a date on which the digital image was captured, among other data. The one or more data structures may further store the digital image associated with the metadata or a pointer to the digital image (e.g., a pointer to a location in a memory at which the digital image is stored). In an example, the newly captured and prior captured digital images are selected for comparison based on the metadata. For example, using the metadata, it may be determined that the newly captured and prior captured images are associated with the same test item but were generated using different item rendering systems. Based on these determinations, the newly captured and prior captured images may be automatically selected for comparison. It is thus noted that the selecting of images for comparison, the comparing of the images via the aforementioned computer-based algorithms, and the providing of anomaly indications may be performed automatically and in a manner that requires no human intervention (or only minimal human intervention).

The computerized approaches described herein for performing quality control of test items and/or test item rendering systems are not of a type that would be carried out by the mental acts of humans. Humans are not capable of performing large numbers of visual comparisons at the level of detail and with the consistency described herein to achieve a level of quality assurance that may be required in high-stakes testing or standardized testing regimes. Also, visual comparisons by humans would not include use of the aforementioned automated digital image analysis algorithms. The use of such computer-based algorithms permits even the slightest discrepancies to be detected between test item renderings. Such discrepancies (e.g., involving a relatively small number of pixel values that differ between renderings) may be undetectable by a human but may affect the validity of the test and result in illegitimate test scores. Further, the conventional quality control techniques performed by humans would not include the aforementioned numerical metrics, data stores, metadata, and data structures. Additional distinctions between the approaches described herein and conventional human quality control techniques are described throughout this disclosure. The approaches described herein are rooted in computer technology and are vastly different than conventional quality control carried out by humans, as noted above. Accordingly, it is evident that the approaches described herein are not mere computer implementation of conventional human quality control and indeed are vastly different from such.

Figure 3A:
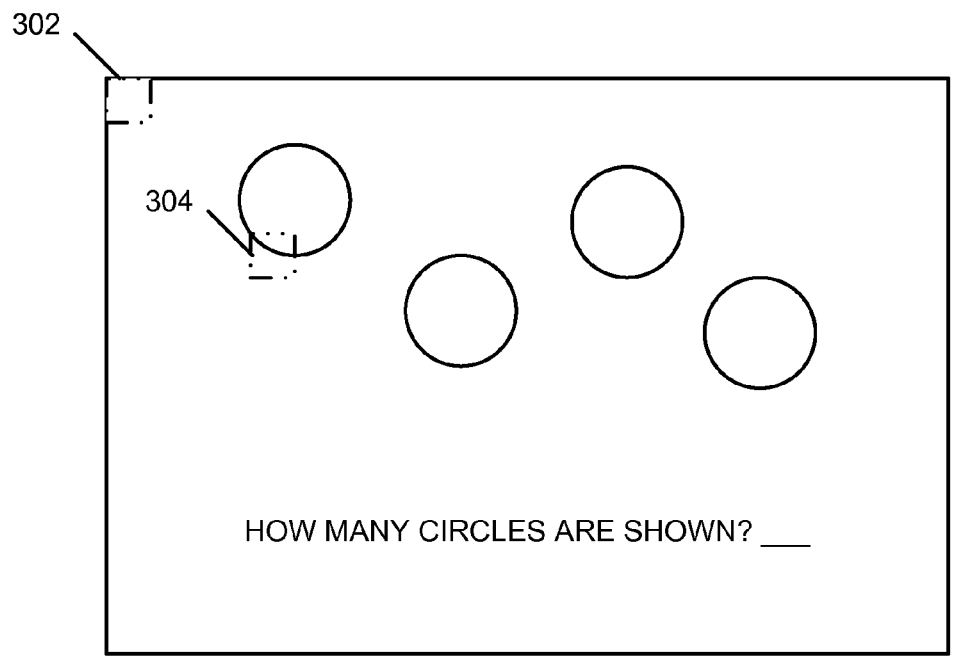
FIGS. 3A and 3B are diagrams depicting two example renderings of a test item by different item rendering engines.
Figure 3B:
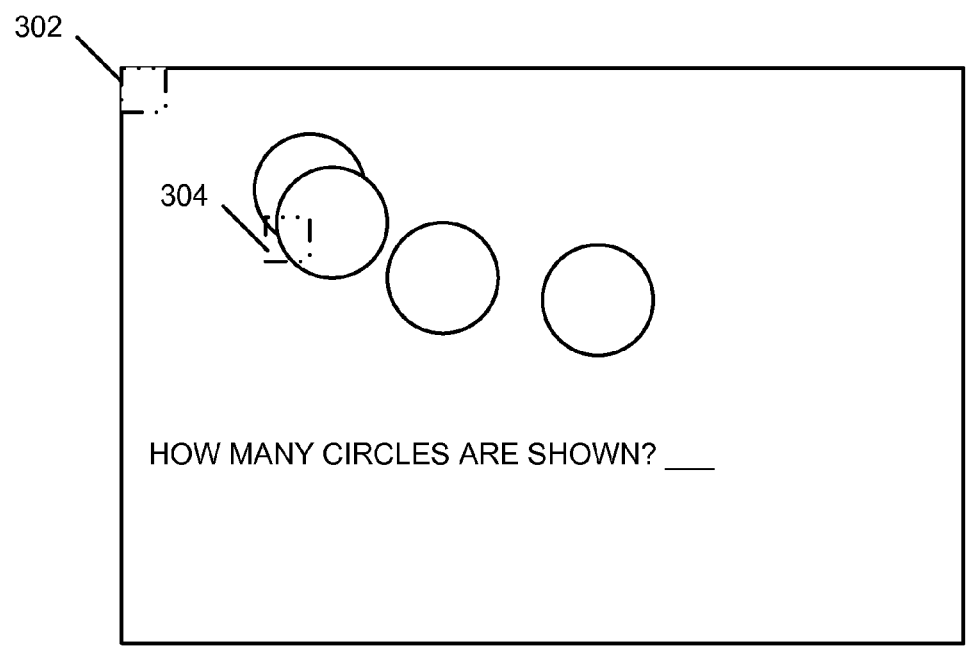

FIGS. 3A and 3B are diagrams depicting two example renderings of a test item by different item rendering engines. FIG. 3A depicts a particular test item rendered by a first item rendering engine. The test item includes four circles and asks a test taker how many circles are depicted. The rendering of FIG. 3A is determined to be a quality rendering, such as based on a review by a quality control technician. FIG. 3B depicts an example rendering of the same particular test item by a different rendering engine. The different rendering engine fails to depict the four circles separately and erroneously stacks certain of the circles. Such deficient rendering may be based on an error in the test item (e.g., an error handled gracefully by the prior rendering engine) or an error in the different rendering engine. A test item rendering comparison engine captures the two screenshots depicted in FIGS. 3A and 3B and compares them, such as on a pixel-by-pixel basis. Certain pixels or groups of pixels in FIGS. 3A and 3B are depicted by dashed boxes. A first pixel or group of pixels 302 compared in the upper left corner is the same across both captures. However, a second pixel or group of pixels 304 differs between the captures. This difference is noted, such as by increasing a count of differences between the screenshots. When a number of detected differences is greater than a threshold number (e.g., 1 or more differences), an anomaly indication is provided.

FIG. 4 is a diagram depicting an example anomaly report. The anomaly report identifies instances where a digital pixel image associated with a recent rendering of a test item differs from a digital pixel image associated with a prior rendering. The report identifies the item associated with the discrepancy, the prior rendering engine (e.g., the engine on which the test item was last certified), the current rendering engine, and the date of the comparison. A user (e.g., technician) can use the anomaly report to investigate the test item and/or the current rendering engine to determine if there are any errors that should be rectified. The anomaly report of FIG. 4 indicates three errors associated with current rendering engine 3D, indicating that rendering engine 3D may be operating improperly. Further, the anomaly report of FIG. 4 indicates a single error associated with current rendering engine 2R, indicating that a test item associated with this error may require evaluation and/or adjustment.

Figure 5:
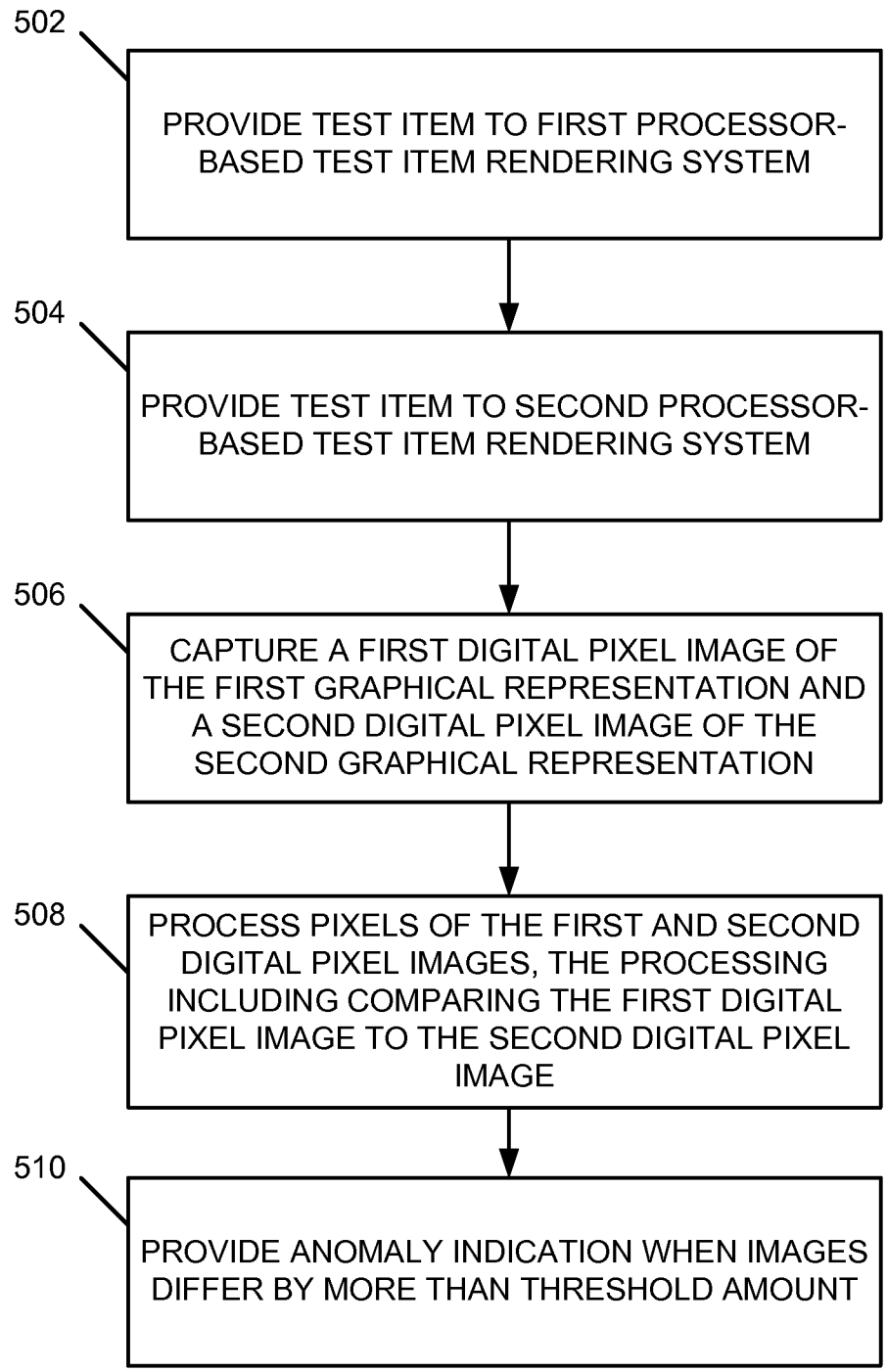
FIG. 5 is a flow diagram depicting a computer-implemented method of determining a test item rendering anomaly.

FIG. 5 is a flow diagram depicting a computer-implemented method of determining a test item rendering anomaly. At 502, a test item is provided to a processor-based first test item rendering system. The first test item rendering system includes a graphics rendering engine and is configured to generate a first graphical representation of the test item. At 504, the test item is provided to a second processor-based test item rendering system. The second test item rendering system includes a graphics rendering engine and is configured to generate a second graphical representation of the test item. At 506, a first digital pixel image of the first graphical representation is captured, and a second digital pixel image of the second graphical representation is captured. At 508, pixels of the first and second digital pixel images are processed, where the processing includes using an automated digital image analysis algorithm. The processing includes comparing the first digital pixel image to the second digital pixel image, and the algorithm generates a numerical metric that indicates an extent to which the second digital pixel image differs from the first digital pixel image. At 510, an anomaly indication for the test item is provided when the numerical metric indicates that the second digital pixel image differs from the first digital pixel image by more than a threshold amount.

Figure 6A:
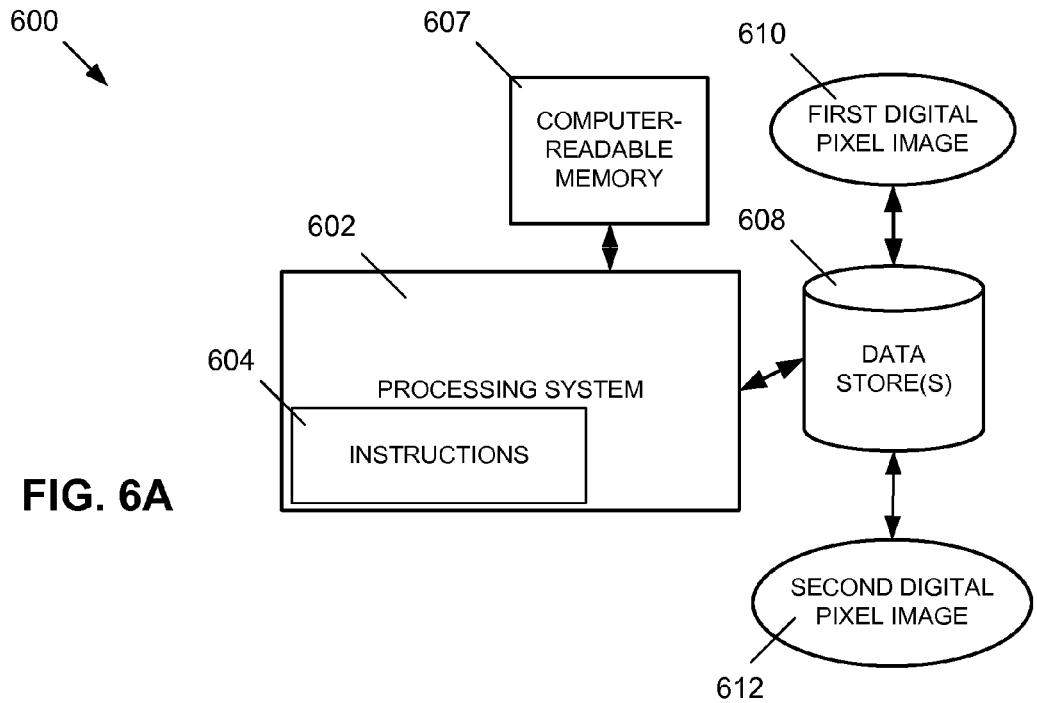
FIGS. 6A, 6B, and 6C depict example systems for determining a test item rendering anomaly.
Figure 6B:
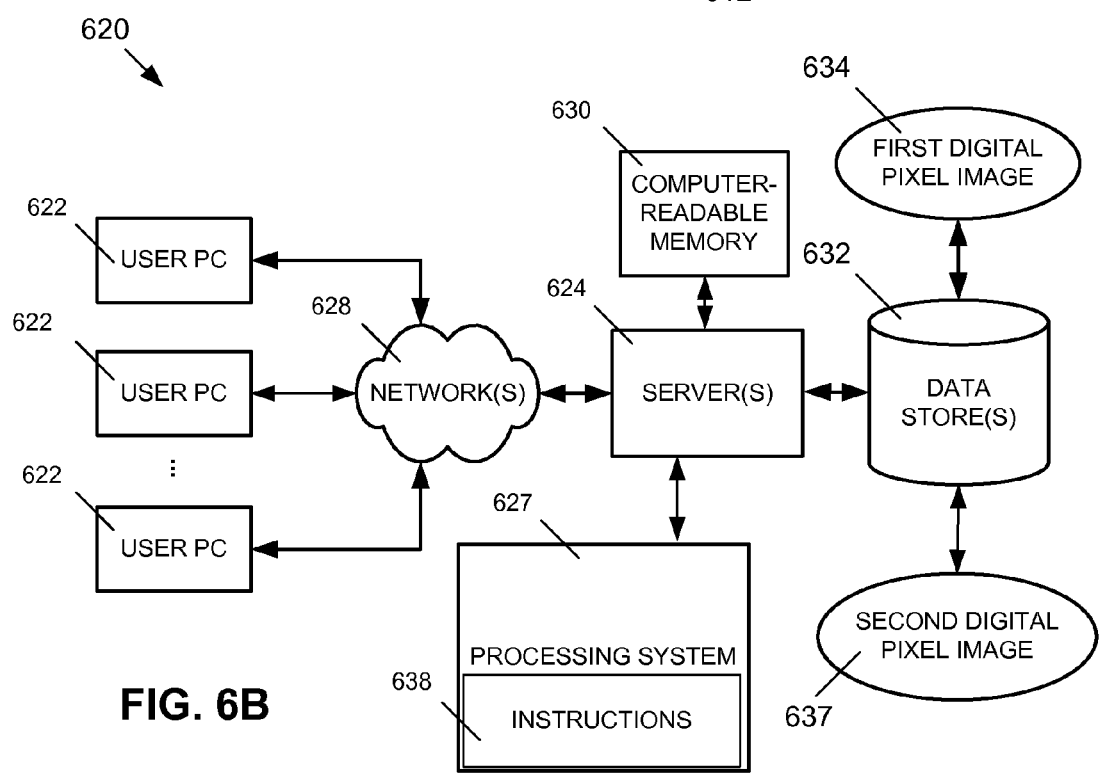
Figure 6C:
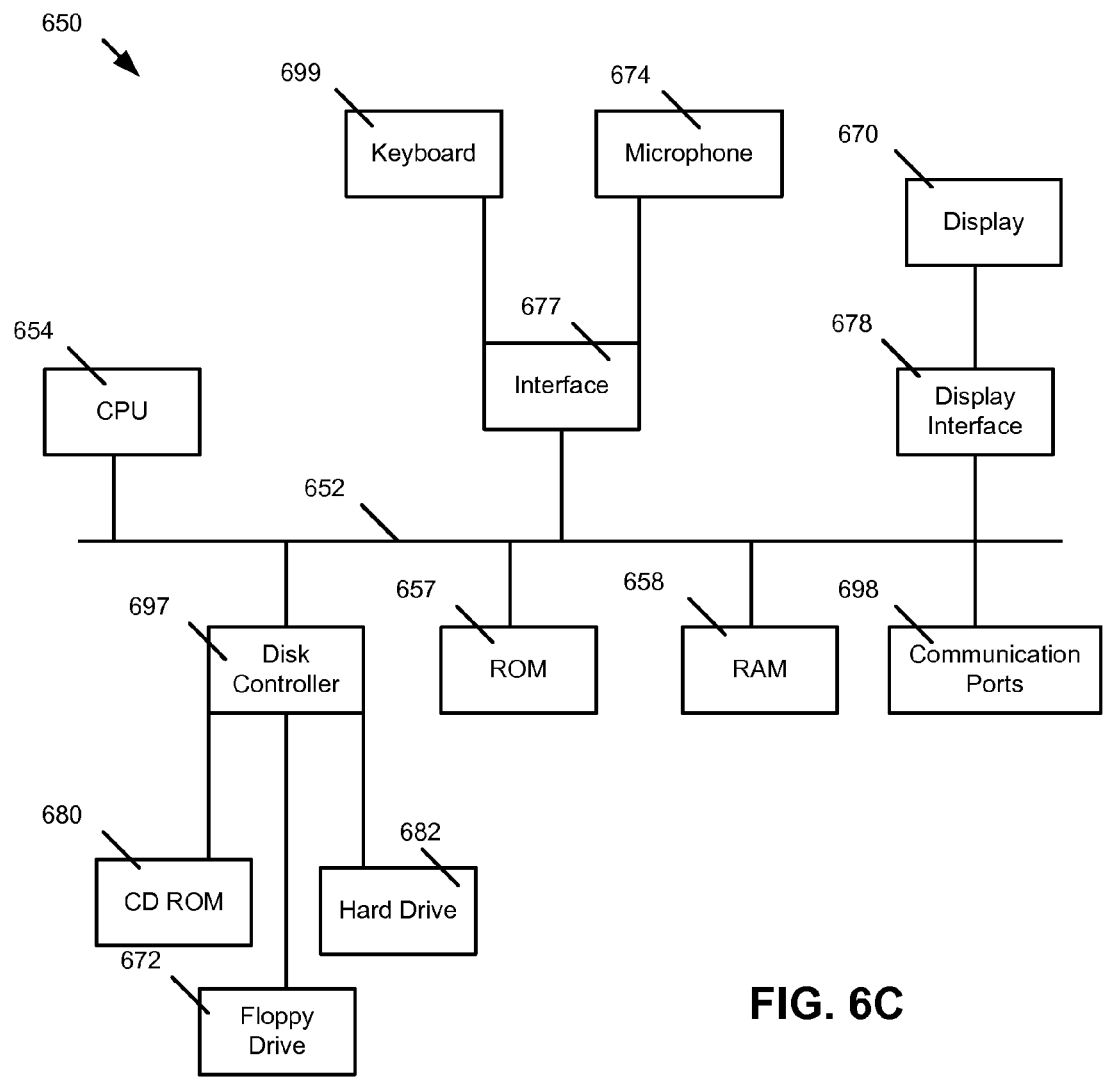

FIGS. 6A, 6B, and 6C depict example systems for determining a test item rendering anomaly. For example, FIG. 6A depicts an exemplary system 600 that includes a standalone computer architecture where a processing system 602 (e.g., one or more computer processors located in a given computer or in multiple computers that may be separate and distinct from one another) includes instructions 604 for determining a test item rendering anomaly. The processing system 602 has access to a computer-readable memory 607 in addition to one or more data stores 608. The one or more data stores 608 may include first digital images 610 as well as second digital images 612. The processing system 602 may be a distributed parallel computing environment, which may be used to handle very large-scale data sets.

FIG. 6B depicts a system 620 that includes a client-server architecture. One or more user PCs 622 access one or more servers 624 executing instructions 638 for determining a test item rendering anomaly on a processing system 627 via one or more networks 628. The one or more servers 624 may access a computer-readable memory 630 as well as one or more data stores 632. The one or more data stores 632 may contain first digital images 634 as well as second digital images 637.

FIG. 6C shows a block diagram of exemplary hardware for a standalone computer architecture 650, such as the architecture depicted in FIG. 6A that may be used to contain and/or implement the program instructions of system embodiments of the present disclosure. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 657 and random access memory (RAM) 658, may be in communication with the processing system 654 and may contain one or more programming instructions for performing the method for determining a test item rendering anomaly. Optionally, program instructions may be stored on a non-transitory computer-readable storage medium such as a magnetic disk, optical disk, recordable memory device, flash memory, or other physical storage medium.

In FIGS. 6A, 6B, and 6C, computer readable memories 607, 630, 657, 658 or data stores 608, 632, 657, 658, 672, 680, 682 may include one or more data structures for storing and associating various data used in the example systems for determining a test item rendering anomaly. For example, a data structure stored in any of the aforementioned locations may be used to associate digital images (or pointers thereto) and metadata for the digital images. Other aspects of the example systems for determining a test item rendering anomaly may be stored and associated in the one or more data structures.

A disk controller 697 interfaces one or more optional disk drives to the system bus 652. These disk drives may be external or internal floppy disk drives such as 672, external or internal CD-ROM, CD-R, CD-RW or DVD drives such as 680, or external or internal hard drives 682. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 697, the ROM 657 and/or the RAM 658. The processor 654 may access one or more components as required.

A display interface 678 may permit information from the bus 652 to be displayed on a display 670 in audio, graphic, or alphanumeric format. Communication with external devices may optionally occur using various communication ports 698.

In addition to these computer-type components, the hardware may also include data input devices, such as a keyboard 699, or other input device 674, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of determining a test item rendering anomaly, comprising:

providing a test item to a processor-based first test item rendering system, the first test item rendering system including a graphics rendering engine and being configured to generate a first graphical representation of the test item;

providing the test item to a second processor-based test item rendering system, the second test item rendering system including a graphics rendering engine and being configured to generate a second graphical representation of the test item;

capturing, using a computer processing system, a first digital pixel image of the first graphical representation and a second digital pixel image of the second graphical representation;

processing pixels of the first and second digital pixel images using the computer processing system, wherein the processing includes using an automated digital image analysis algorithm, the processing including comparing the first digital pixel image to the second digital pixel image, the algorithm generating a numerical metric that indicates an extent to which the second digital pixel image differs from the first digital pixel image; and providing an anomaly indication for the test item when the numerical metric indicates that the second digital pixel image differs from the first digital pixel image by more than a threshold amount;

storing metadata for each of the first and second digital pixel images in one or more data structures, the metadata including data that identifies the test item, the rendering system used in generating the digital pixel image, and a date on which the digital pixel image was captured; and automatically selecting the first and second digital pixel images for comparison based on the metadata.

2. The method of claim 1, wherein the comparing of the first digital pixel image to the second digital pixel image comprises performing a pixel-by-pixel comparison of the first digital pixel image and the second digital pixel image to determine whether the second test item rendering system is rendering the test item differently than the first test item rendering system, the anomaly indication being provided when more than a threshold number of pixels differ between the first digital pixel image and the second digital pixel image.

3. The method of claim 1, wherein the first and second test item rendering systems are configured to (i) process the test item, and (ii) convert the test item into a form suitable for display on a computer monitor or for printing on paper.

4. The method of claim 1, wherein the test item is certified as a usable test item based on the first digital pixel image, and wherein a determination of whether the test item retains a certified status is based on the comparing of the first digital pixel image to the second digital pixel image.

5. The method of claim 1, wherein the anomaly indication is provided via a report, the report indicating that the test item requires adjustment.

6. The method of claim 1, wherein the anomaly indication is provided via a report, the report indicating that the second test item rendering system requires adjustment.

7. A computer-implemented system of determining a test item rendering anomaly, the system comprising:

one or more processing systems; and one or more non-transitory computer-readable storage mediums in communication with the one or more processing systems and encoded with instructions for commanding the one or more processing systems to execute steps comprising:

providing a test item to a processor-based first test item rendering system, the first test item rendering system including a graphics rendering engine and being configured to generate a first graphical representation of the test item;

providing the test item to a second processor-based test item rendering system, the second test item rendering system including a graphics rendering engine and being configured to generate a second graphical representation of the test item;

capturing a first digital pixel image of the first graphical representation and a second digital pixel image of the second graphical representation;

processing pixels of the first and second digital pixel images, wherein the processing includes using an automated digital image analysis algorithm, the processing including comparing the first digital pixel image to the second digital pixel image, the algorithm generating a numerical metric that indicates an extent to which the second digital pixel image differs from the first digital pixel image; and providing an anomaly indication for the test item when the numerical metric indicates that the second digital pixel image differs from the first digital pixel image by more than a threshold amount;

storing metadata for each of the first and second digital pixel images in one or more data structures, the metadata including data that identifies the test item, the rendering system used in generating the digital pixel image, and a date on which the digital pixel image was captured; and automatically selecting the first and second digital pixel images for comparison based on the metadata.

8. The system of claim 7, wherein the comparing of the first digital pixel image to the second digital pixel image comprises performing a pixel-by-pixel comparison of the first digital pixel image and the second digital pixel image to determine whether the second test item rendering system is rendering the test item differently than the first test item rendering system, the anomaly indication being provided when more than a threshold number of pixels differ between the first digital pixel image and the second digital pixel image.

9. The system of claim 7, wherein the first and second test item rendering systems are configured to (i) process the test item, and (ii) convert the test item into a form suitable for display on a computer monitor or for printing on paper.

10. The system of claim 7, wherein the test item is certified as a usable test item based on the first digital pixel image, and wherein a determination of whether the test item retains a certified status is based on the comparing of the first digital pixel image to the second digital pixel image.

11. The system of claim 7, wherein the anomaly indication is provided via a report, the report indicating that the test item requires adjustment.

12. The system of claim 7, wherein the anomaly indication is provided via a report, the report indicating that the second test item rendering system requires adjustment.

13. A non-transitory computer-readable storage medium for determining a test item rendering anomaly, the computer-readable storage medium comprising computer executable instructions which, when executed, cause a processing system to execute steps comprising:
- providing a test item to a processor-based first test item rendering system, the first test item rendering system including a graphics rendering engine and being configured to generate a first graphical representation of the test item;
- providing the test item to a second processor-based test item rendering system, the second test item rendering system including a graphics rendering engine and being configured to generate a second graphical representation of the test item;
- capturing a first digital pixel image of the first graphical representation and a second digital pixel image of the second graphical representation;
- processing pixels of the first and second digital pixel images, wherein the processing includes using an automated digital image analysis algorithm, the processing including comparing the first digital pixel image to the second digital pixel image, the algorithm generating a numerical metric that indicates an extent to which the second digital pixel image differs from the first digital pixel image; and
- providing an anomaly indication for the test item when the numerical metric indicates that the second digital pixel image differs from the first digital pixel image by more than a threshold amount;
- storing metadata for each of the first and second digital pixel images in one or more data structures, the metadata including data that identifies the test item, the rendering system used in generating the digital pixel image, and a date on which the digital pixel image was captured; and
- automatically selecting the first and second digital pixel images for comparison based on the metadata.

14. The non-transitory computer-readable storage medium of claim 13, wherein the comparing of the first digital pixel image to the second digital pixel image comprises performing a pixel-by-pixel comparison of the first digital pixel image and the second digital pixel image to determine whether the second test item rendering system is rendering the test item differently than the first test item rendering system, the anomaly indication being provided when more than a threshold number of pixels differ between the first digital pixel image and the second digital pixel image.

15. The non-transitory computer-readable storage medium of claim 13, wherein the first and second test item rendering systems are configured to (i) process the test item, and (ii) convert the test item into a form suitable for display on a computer monitor or for printing on paper.

16. The non-transitory computer-readable storage medium of claim 13, wherein the test item is certified as a usable test item based on the first digital pixel image, and wherein a determination of whether the test item retains a certified status is based on the comparing of the first digital pixel image to the second digital pixel image.

17. The non-transitory computer-readable storage medium of claim 13, wherein the anomaly indication is provided via a report, the report indicating that the test item requires adjustment.

18. The non-transitory computer-readable storage medium of claim 13, wherein the anomaly indication is provided via a report, the report indicating that the second test item rendering system requires adjustment.

* * * * *